UNITED STATES PATENT OFFICE.

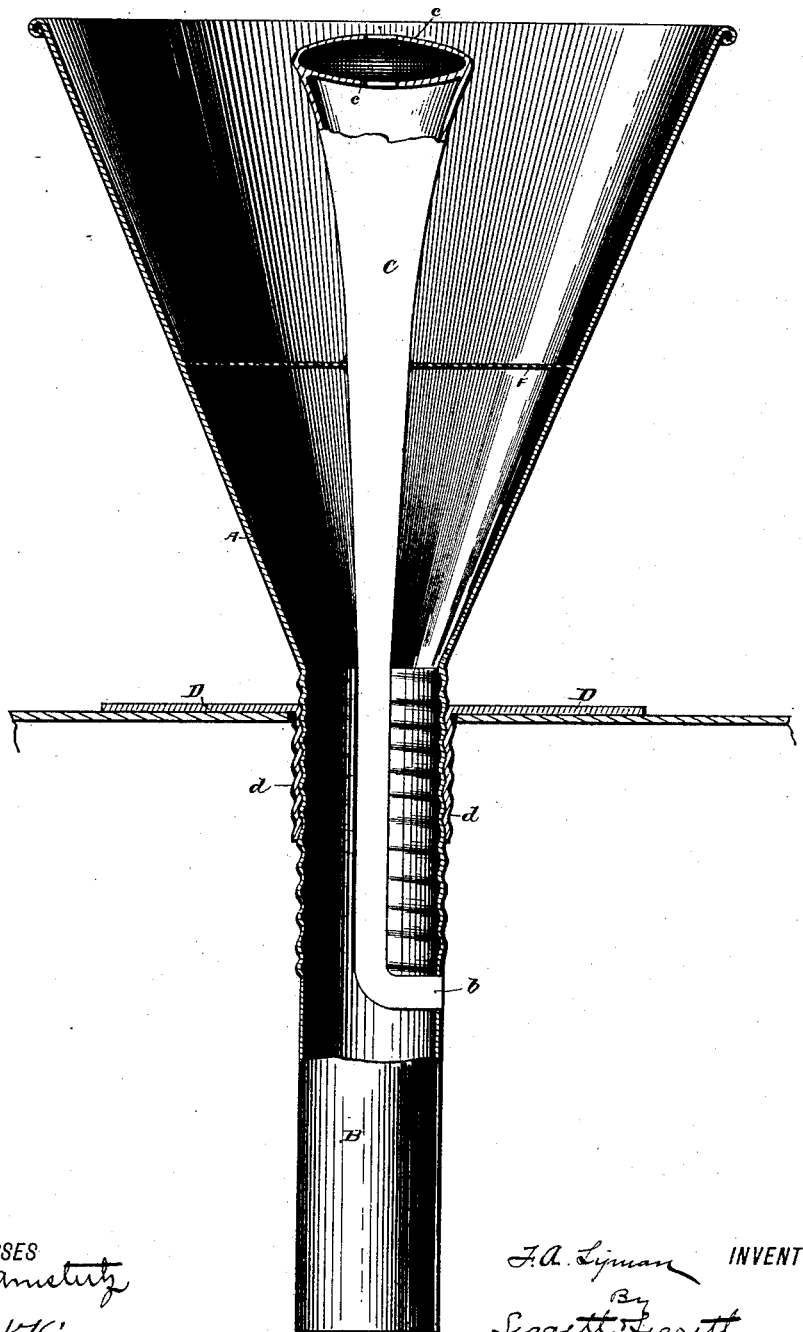

FORDYCE ALLEN LYMAN, OF CLEVELAND, OHIO.

FUNNEL.

SPECIFICATION forming part of Letters Patent No. 374,875, dated December 13, 1887.

Application filed June 8, 1887. Serial No. 240,649. (No model.)

*To all whom it may concern:*

Be it known that I, FORDYCE ALLEN LYMAN, of Cleveland, in the county of Cuyahoga and State of Ohio, have invented certain new and useful Improvements in Filling-Funnels; and I do hereby declare the following to be a full, clear, and exact description of the invention, such as will enable others skilled in the art to which it pertains to make and use the same.

My invention relates to improvements in funnels in which an air-vent tube and whistle are employed to give warning when the filling-line is reached in the vessel being filled. An adjustable stop is connected with the funnel for engaging the vessel, by adjusting which the induction end of the vent-tube is made to reach to the desired filling-line. A strainer is stretched across the funnel and made to embrace the vent-tube, the strainer being secured to both funnel and vent-tube, and is made to serve as a filter and as a support to the vent-tube.

With these objects in view my invention consists in certain features of construction and in combination of parts, hereinafter described, and pointed out in the claims.

In the accompanying drawing the figure is an elevation in section of a funnel and attachment embodying my invention.

A represents the body of the funnel, and B the discharging-nozzle of the funnel.

C is an air-vent tube, located preferably inside the funnel, with a whistle, $c$, connected with the vent-tube, and so arranged that the air displaced in filling the vessel blows the whistle. A preferable construction is shown where the vent-tube is located centrally in the funnel, the lower end of the tube being turned to the one side, secured to the wall of the nozzle, the latter having a corresponding lateral opening, $b$, to admit air from the vessel into the vent-tube. The vent-tube should open into the vessel at the desired filling-line, and when the liquid in the vessel covers the mouth of the tube the sound of the whistle ceases, thereby giving warning that the vessel is sufficiently filled. As the filling-line will vary somewhat in different kinds of vessels, an adjustable stop is provided to rest on the barrel, can, bottle, or other vessel, and by adjusting this stop up or down the mouth of the vent-tube may be made to reach to the desired filling-line. A preferable arrangement of the stop is shown, the stop D being mounted on the funnel-nozzle and made adjustable endwise of the latter. If the nozzle and stop are of sheet material, as they are likely to be, coarse thread $d$ may be "struck up" on nozzle and stop for mutual engagement. If the parts are of thicker material, a thumb-screw may be had for adjustably securing the stop.

I do not wish here to limit myself to the construction shown, as the parts may be varied indefinitely without departing from the spirit and purpose of my invention.

When the vent-tube is placed inside the funnel, as shown, a strainer, F, may be stretched across the funnel and made to embrace the vent-tube, the strainer being made to serve the purpose of a filter, and serving also to support the vent-tube.

What I claim is—

1. The combination, with funnel and vent-tube, the latter being located inside the funnel, of a strainer secured to the funnel and made to embrace the vent-tube as a support for the latter, substantially as set forth.

2. The combination, with a funnel and a vent-tube, the latter being located inside of the funnel, of a strainer secured to the funnel and made to embrace the vent-tube, and an adjustable stop secured to the discharge-nozzle of the funnel, substantially as set forth.

In testimony whereof I sign this specification, in the presence of two witnesses, this 21st day of May, 1887.

FORDYCE ALLEN LYMAN.

Witnesses:
 CHAS. H. DORER,
 ALBERT E. LYNCH.